(12) United States Patent
Pantigny et al.

(10) Patent No.: US 6,603,109 B2
(45) Date of Patent: Aug. 5, 2003

(54) CIRCUIT FOR READING ADAPTIVE PREAMPLIFICATION CHARGES AND PROCESS FOR READING ADAPTIVE PREAMPLIFICATION CHARGES

(75) Inventors: Philippe Pantigny, Claix (FR); Arnaud LaFlaquire, Grenoble (FR); Frédéric Rothan, Seyssinet (FR)

(73) Assignee: Commissariat a l'Energie Atomique, Paris (FR)

( * ) Notice: Subject to any disclaimer, the term of this patent is extended or adjusted under 35 U.S.C. 154(b) by 71 days.

(21) Appl. No.: 09/994,622

(22) Filed: Nov. 28, 2001

(65) Prior Publication Data

US 2002/0109098 A1 Aug. 15, 2002

(30) Foreign Application Priority Data

Dec. 14, 2000 (FR) ............................................. 00 16316

(51) Int. Cl.[7] ................................................. H01J 40/14
(52) U.S. Cl. ................................... 250/214 R; 257/223
(58) Field of Search .......................... 250/214 R, 214.1, 250/208.1; 348/308–312, 320; 257/223, 215, 229

(56) References Cited

U.S. PATENT DOCUMENTS

| 5,742,058 A | | 4/1998 | Pantigny et al. | |
| 6,104,020 A | * | 8/2000 | Knee et al. | ............... 250/208.1 |

FOREIGN PATENT DOCUMENTS

GB 2230905 A 5/1999

* cited by examiner

*Primary Examiner*—Que T. Le
(74) *Attorney, Agent, or Firm*—Oblon, Spivak, McClelland, Maier & Neustadt, P.C.

(57) ABSTRACT

The invention relates to a circuit for reading charges comprising a capacitive means (C1, C2) with capacitance $C_a$ to store charges and means of reading a voltage sampled at the terminals of the capacitive means. The capacitive means is built up from a first capacitive means (C1) and a second capacitive means (C2) with a capacitance $C_b$ less than $C_a$. The read circuit comprises means of comparing the voltage read at the terminals of the capacitive means with a threshold value ($V_{threshold}$) and means of controlling the transfer of charges stored in the first capacitive means to the second capacitive means when the voltage read at the terminals of the capacitive means exceeds the threshold value ($V_{threshold}$). The invention is applicable to detection of radiation in the imagery field.

10 Claims, 3 Drawing Sheets

CIRCUIT FOR READING ADAPTIVE PREAMPLIFICATION CHARGES AND PROCESS FOR READING ADAPTIVE PREAMPLIFICATION CHARGES

TECHNICAL FIELD AND THE PRIOR ART

This invention relates to a circuit for reading charges and a process for reading charges.

The invention also relates to a radiation detector circuit.

According to known art, a radiation detector circuit comprises a set of elementary detectors to convert detected radiation into electrical charges and a circuit for reading the detected charges.

The circuit for reading detector charges comprises an elementary integrator circuit of the switched follower type, for each elementary detector. An elementary integrator circuit is shown in FIG. 1. It comprises an integration capacitor $C_{int}$, a switch $I_a$ and a follower circuit S. Detected charges form a current Iph that is integrated in the capacitor $C_{int}$. The switch $I_a$ is used to reinitialize the potential of the read node by application of a reinitialization voltage $V_r$. The follower circuit S outputs a voltage variation $V_s$ proportional to the current Iph.

The maximum allowable photonic current $Iph_{max}$, the integration time Ti of charges in the capacitor $C_{int}$ and the integration capacitor $C_{int}$ satisfy the following relation:

$$Iph_{max} \times Ti \leq \frac{\Delta V_S \max}{G} \times C_{int}$$

where $\Delta V_{smax}$ is the maximum voltage excursion at the output from the follower S and G is the voltage gain of the follower. In the rest of this description, the gain G will be assumed to be equal to 1, which is the theoretical value of the gain of a voltage follower.

Similarly, the minimum allowable photonic current $Iph_{min}$ due to the photonic noise charge (read noise) satisfies the following relation:

$$\sqrt{q \times Iph_{min} \times Ti} = C_{int} \times <Vb-pel>$$

where q is the charge of the electron and <Vb-pel> is the rms noise at the input to the follower.

These two relations may be combined to obtain a current input excursion in the elementary integrator circuit:

$$\frac{Iph_{min}}{Iph_{max}} = \frac{1}{q \times \Delta V_{Smax}} \times C_{int} \times <Vb-pel>^2$$

For example, for $\Delta V_{smax}$ equal to approximately 2 volts, $C_{int}$ equal to approximately 1 pF and <Vb-pel> equal to approximately 100 µV-rms, the input excursion is equal to approximately 1/32, knowing that the signal to noise ratio of the photodiode is degraded by √2 under the minimal illumination.

These performances are sufficient for some applications. However, other applications necessitate an increase in the input excursion of the elementary point to enable a wider illumination range, for example to solve glare problems or problems with scenes with high contrast.

The invention provides a good solution to this need.

PRESENTATION OF THE INVENTION

The invention relates to a circuit for reading charges comprising a capacitive means with capacitance $C_a$ to store charges and means of reading a voltage sampled at the terminals of the capacitive means. The capacitive means is built up from a first capacitive means and a second capacitive means with a capacitance $C_b$ less than $C_a$. The read circuit comprises means of comparing the voltage read at the terminals of the capacitive means with a threshold value, means of controlling the transfer of charges stored in the first capacitive means to the second capacitive means with a capacitance $C_b$ less than $C_a$ when the voltage read at the terminals of the capacitive means exceeds the threshold value and means of reading a voltage sampled at the terminals of the second capacitive means.

The invention also relates to a process for reading charges comprising a step to integrate charges in a capacitive means with capacitance $C_a$ and a step to read a voltage at the terminals of the capacitive means. The capacitive means consists of a first capacitive means and a second capacitive means with capacitance $C_b$ less than $C_a$. The process comprises firstly a step to compare the voltage read at the terminals of the capacitive means with a threshold voltage, a step to transfer charges stored in the first capacitive means to the second capacitive means with a capacitance $C_b$ less than $C_a$ when the voltage read at the terminals of the capacitive means exceed the threshold value, and a step to read a voltage at the terminals of the second capacitive means.

The invention also relates to a radiation detector circuit comprising at least one photo detector to convert detected radiation into electric charges and a circuit to read electric charges. The read electric charges circuit is a circuit to read charges according to the invention.

BRIEF DESCRIPTION OF THE FIGURES

Other characteristics and advantages of the invention will become apparent after reading a preferred embodiment of the invention given with reference to the attached figures among which.

DETAILED DESCRIPTION OF EMBODIMENTS OF THE INVENTION

Figure 1:
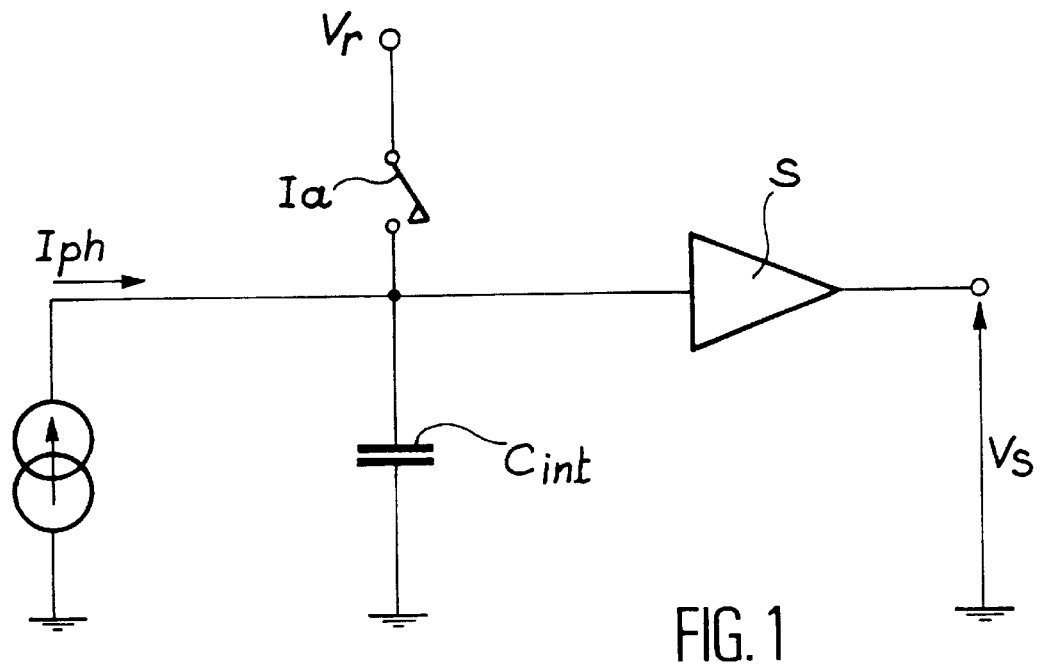
FIG. 1 shows an elementary integrator circuit of the follower type according to prior art.

FIG. 1 has already been described, therefore there is no need to describe it further.

Figure 2:
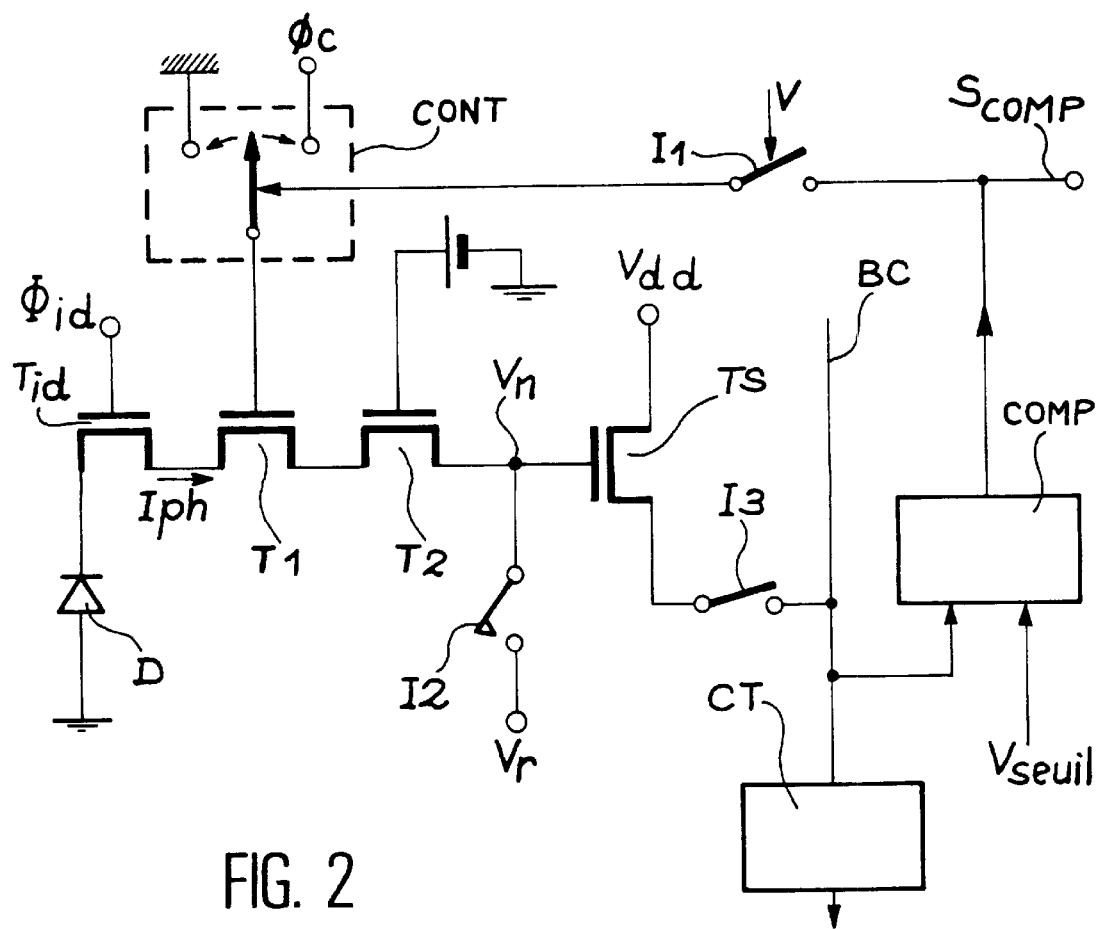
FIG. 2 shows an elementary integrator circuit of the follower type according to a first embodiment of the invention.

FIG. 2 represents an elementary follower type integrator circuit according to a first embodiment of the invention.

The elementary integrator circuit comprises two MOS T1 and T2 technology transistors (MOS stands for "Metal Oxide Semiconductor"), three switches I1, I2, I3, a transistor TS mounted as a voltage follower, a comparator COMP and a control means CONT. The integrator circuit is connected to a detector composed of a photodiode D and a direct injection MOS transistor $T_{id}$ controlled on its grid by a voltage $\Phi_{id}$. According to a first embodiment of the invention, the two transistors T1 and T2 are installed in series. The drain of transistor $T_{id}$ is input to the channel of transistors T1 and T2. The source of transistor TS is connected to a column bus BC through switch I3. The column bus BC is connected to a processing circuit CT. The switch I2 reinitializes the potential $V_n$ of the read node at a reinitialization voltage Vr. The comparator COMP has a first input connected through a switch I3 to the output from transistor TS and a second input connected to a voltage source $V_{threshold}$. The output from the comparator is connected through switch I1 to control means CONT. The switch I1 is controlled by a voltage V. When the switch I1 is closed, the signal $S_{COMP}$ output from the comparator is applied to the control means CONT. During the integration phase, the control means CONT changes the potential of the grid of transistor T1 to $\Phi_c$. The transistor T1 is then polarized as an integration capacitance C1 and the charges are also integrated in transistor T2 that is polarized as an integration capacitance C2. The capacitances C1 and C2 are in parallel.

Figure 3:
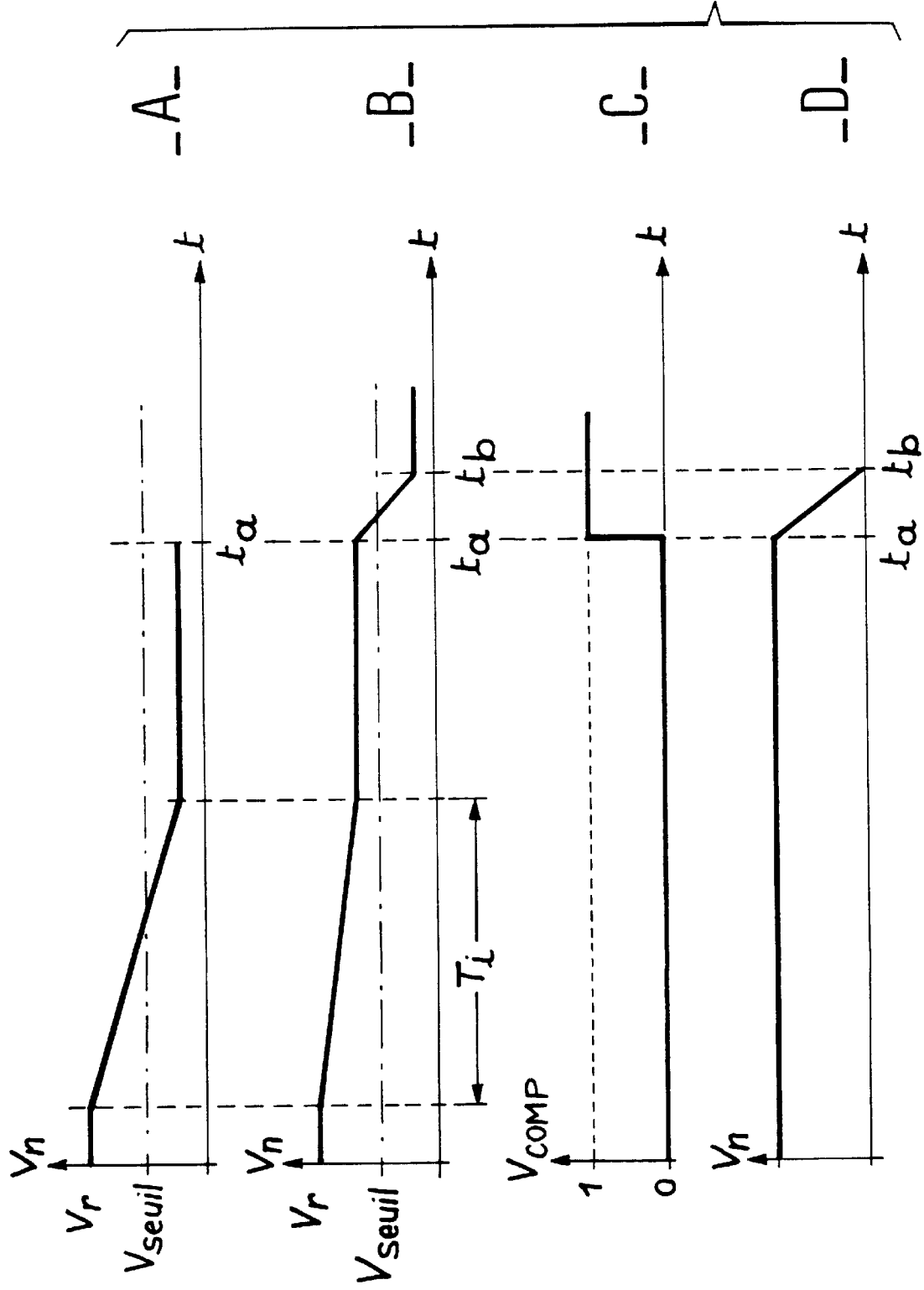
FIG. 3 shows time diagrams related to operation of the follower type integrator circuit in FIG. 2.

We will now describe operation of the elementary integrator circuit in FIG. 2, with reference to the time diagrams in FIG. 3. Note in this case that the direction of variation of the voltages of the time diagrams in FIG. 3 may also be inverted depending on the nature of the charges that are transferred.

The integrator circuit enables integration of the current in the channel of the MOS transistors T1 and T2 that form the capacitances C1 and C2. The potential $V_n$ of the read node changes as a function of time as shown on FIG. 3(A) or FIG. 3(B) depending on whether the detected current Iph is a high current or a low current.

High current means a current Iph such that at the end of the integration time Ti, the output voltage from the follower TS is less than the threshold voltage $V_{threshold}$. Similarly, low current means a current Iph such that at the end of the integration time Ti, the output voltage from follower TS is greater than the threshold voltage $V_{threshold}$.

In the first case (high current) the voltage read is directly the voltage taken at the output from the follower TS, namely:

$$\Delta V_1 = Q_{ph}/(C1+C2)$$

where Qph=Iph×Ti and where C1 and C2 are the capacitances of the channels of transistors T1 and T2 respectively. The voltage $\Delta V_1$ is then sampled and multiplexed to the video output.

In the second case (low current), the comparator switches at time ta (see FIG. 3(C)) and the signal that it outputs controls the control means CONT so as to apply a falling front to the grid of T1 (see FIG. 3(D)). Charges stored in the channel of Ti are then injected into the channel of T2 between times ta and tb. At the end of this charge transfer, the voltage variation on the read node is:

$$\Delta V_2 = Q_{ph}/C2$$

Therefore, the voltage response of the elementary read circuit is advantageously multiplied by the factor $$\frac{C_1 + C_2}{C_2}.$$

In practice, this factor is equal to at least 5. Advantageously, the noise due to transistor TS is divided by this same factor.

Thus, for a given follower noise, the read noise is reduced, which results in an increase in the Iphmax/Iphmin ratio.

Furthermore, the fact that the voltage response of the integrator circuit increases at low current makes it possible to reduce input noise constraints to the output side multiplexing system if necessary.

Switching of switch I3 disturbs the memorized information on the capacitive integration means, by capacitive coupling with the read node. However, this coupling is minimized since the input to the integrator circuit is charged by the sum of capacitances C1 and C2 when addressing the integrator circuit (closing switch I3).

The comparison signal $S_{COMP}$ output by the comparator is a means of knowing the capacitance on which the charges were measured. The comparison signal $S_{COMP}$ coupled with the measurement of the read voltage can then be used to calculate the value of the charge detected by the detector D.

According to the first embodiment of the invention described above, the integrator circuit comprises two MOS transistors in series T1 and T2. Other embodiments of the invention are also possible, such as the embodiments shown in FIGS. 4 and 5.

Figure 4:
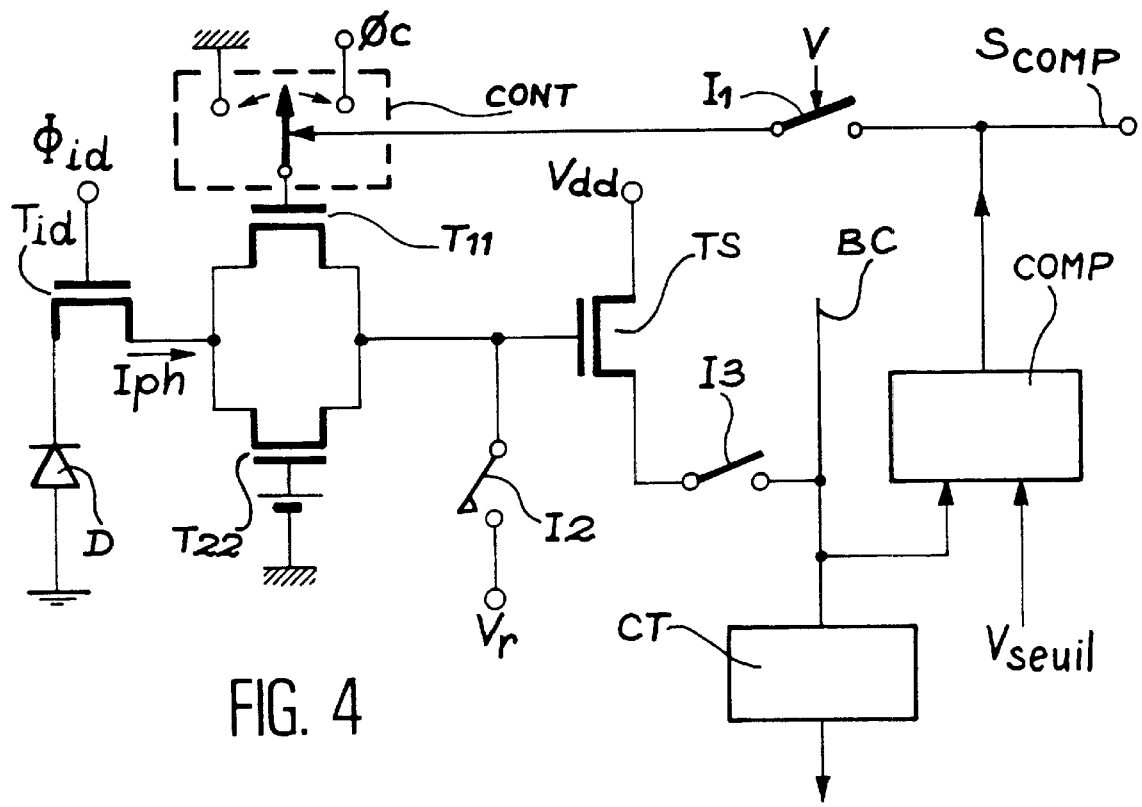
FIG. 4 shows an elementary integrator circuit of the follower type according to a second embodiment of the invention.

According to the embodiment shown in FIG. 4, the means of storage of the detected charges are capacitances C3 and C4 installed in parallel, composed of MOS transistors T11 and T12 installed in parallel. The control means CONT controls the grid of transistor T11 and transistor T22 is polarized as an integration capacitance.

Figure 5:
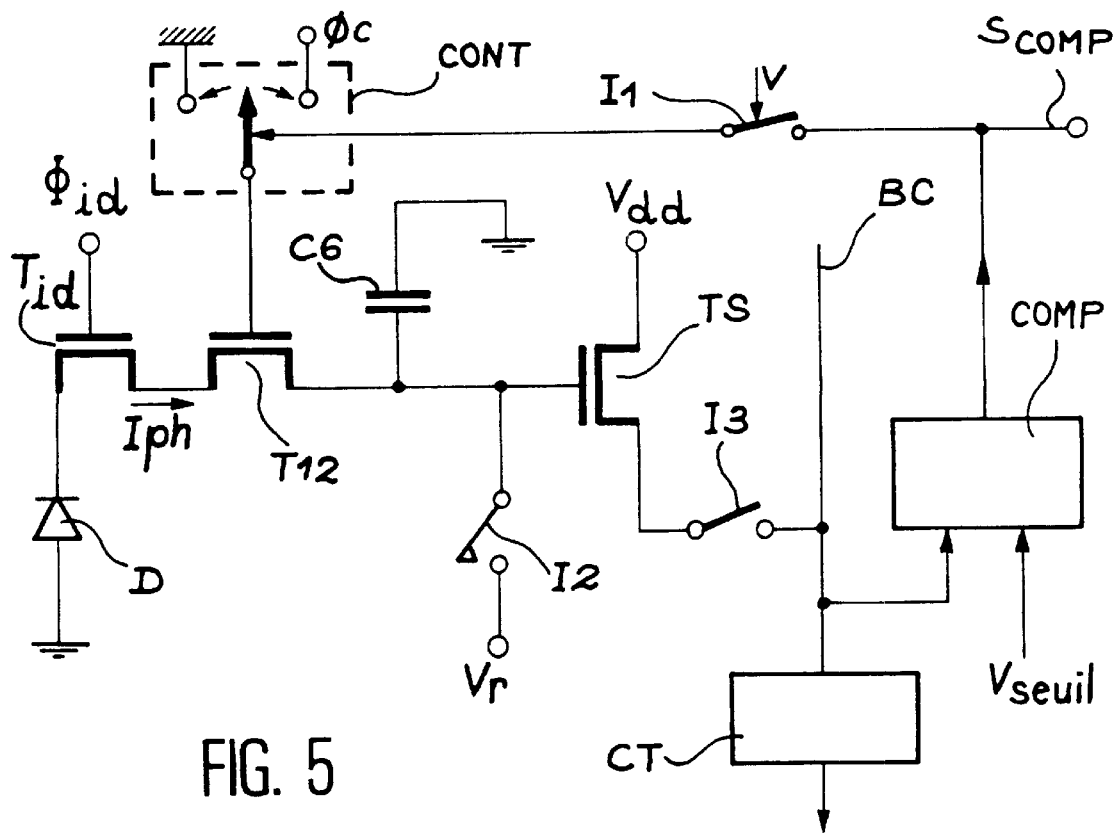
FIG. 5 shows an elementary integrator circuit of the follower type according to a third embodiment of the invention, The same marks denote the same elements on all figures.

According to another embodiment of the invention shown on FIG. 5, the means of storage of the detected charges are capacitances C5 and C6 installed in parallel connected using a MOS transistor T12 and a fixed value capacitor respectively. The grid of transistor T12 is controlled by the control means CONT.

Regardless of the embodiment, the integrator circuit according to the invention may be made using different technologies. Thus, the photodiode may be connected to the integration channel by balls, using an impedance matching device. It may also be made on the integrated read circuit (N or P diode for detection in the visible range). For example, the MOS transistors may be made on the same active layer (BULK CMOS or standard SOI) or on different active layers connected to each other by molecular bonding type techniques.

What is claimed is:

1. Circuit for reading charges comprising a capacitive means (C1, C2) with capacitance $C_a$ to store charges and means of reading a voltage sampled at the terminals of the capacitive means, characterized in that the capacitive means is built up from a first capacitive means (C1) and a second capacitive means (C2) with a capacitance $C_b$ less than $C_a$, comprising means (COMP) of comparing the voltage read at the terminals of the capacitive means with a threshold value ($V_{threshold}$), means of controlling the transfer of charges stored in the first capacitive means (C1) to the second capacitive means (C2) with a capacitance $C_b$ less than $C_a$ when the voltage read at the terminals of the capacitive means exceeds the threshold value ($V_{threshold}$) and means of reading a voltage sampled at the terminals of the second capacitive means.

2. Read circuit according to claim 1, characterized in that the capacitive means comprises a first MOS transistor.

3. Read circuit according to claim 2, characterized in that the capacitive means comprises a second MOS transistor in series with the first MOS transistor, the second MOS transistor forming the second capacitive means.

4. Read circuit according to claim 2, characterized in that the capacitive means comprises a second MOS transistor in parallel with the first MOS transistor, the second MOS transistor forming the second capacitive means.

5. Read circuit according to claim 2, characterized in that the second capacitive means is a capacitor with a fixed value (C6).

6. Read circuit according to any one of the previous claims, characterized in that the means of reading a voltage sampled at the terminals of the capacitive means form means of reading a voltage sampled at the terminals of the second capacitive means.

7. Read circuit according to any one of the claims 1–5 characterized in that the means of reading a voltage sampled at the terminals of the capacitive means comprise a voltage follower (TS).

8. Radiation detector circuit comprising at least one photo detector (D) to convert detected radiation into electric charges and an electric charge reading circuit, characterized in that the electric charge reading circuit is a circuit for reading charges according to any one of the previous claims.

9. Process for reading charges comprising a step in which charges are integrated in a capacitive means (C1, C2) with capacitance $C_a$ and a step in which the voltage at the terminals of the capacitive means is read, characterized in that the capacitive means is built up from a first capacitive means (C1) and a second capacitive means (C2) with a capacitance $C_b$ less than $C_a$, the read process comprises a step in which the voltage read at the terminals of the capacitive means is compared with a threshold voltage ($V_{threshold}$), a step in which charges stored in the first capacitive means are transferred to the second capacitive means with a capacitance $C_b$ less than $C_a$ when the voltage read at the terminals of the capacitive means exceeds the threshold value ($V_{threshold}$) and a step in which a voltage at the terminals of the second capacitive means is read.

10. Process for reading charges according to claim 9, characterized in that it comprises a step for measuring the value of charges integrated in the capacitive means starting from a value of the comparison voltage determined during the comparison step and the value of the voltage read.

* * * * *

UNITED STATES PATENT AND TRADEMARK OFFICE
CERTIFICATE OF CORRECTION

PATENT NO. : 6,603,109 B2
DATED : August 5, 2003
INVENTOR(S) : Pantigny et al.

It is certified that error appears in the above-identified patent and that said Letters Patent is hereby corrected as shown below:

<u>Title page,</u>
Item [75], Inventors, should read
-- [75] Inventors: Philippe Pantigny, Claix (FR);
                  Arnaud LaFlaquiere, Pessac (FR);
                  Frédéric Rothan, Seyssinet (FR) --

Signed and Sealed this

Second Day of December, 2003

JAMES E. ROGAN
*Director of the United States Patent and Trademark Office*